United States Patent [19]

Hart

[11] Patent Number: 5,103,368

[45] Date of Patent: Apr. 7, 1992

[54] CAPACITIVE FLUID LEVEL SENSOR

[75] Inventor: John R. Hart, Lexington, Ohio

[73] Assignee: Therm-O-Disc, Incorporated, Mansfield, Ohio

[21] Appl. No.: 519,731

[22] Filed: May 7, 1990

[51] Int. Cl.⁵ .............................................. G01F 23/26
[52] U.S. Cl. ................................. 361/284; 73/304 C
[58] Field of Search .................... 361/284; 340/620; 73/304 C

[56] References Cited

U.S. PATENT DOCUMENTS

| | | | |
|---|---|---|---|
| 2,700,901 | 2/1955 | Rickner | 73/304 C |
| 2,950,426 | 8/1960 | Frome | 361/284 |
| 2,998,559 | 8/1961 | Smith | 73/304 C |
| 3,192,455 | 6/1965 | Bergeson | 73/304 C X |
| 3,827,300 | 8/1974 | Thaler | 73/304 C |
| 4,099,167 | 7/1978 | Pomerantz et al. | 73/304 C X |
| 4,295,370 | 10/1981 | Bristol | 73/340 C |
| 4,601,201 | 7/1986 | Oota et al. | 73/304 C |
| 4,806,847 | 2/1989 | Athertone et al. | 324/61 P |
| 4,943,889 | 7/1990 | Ohmatoi | 361/284 |

Primary Examiner—Donald A. Griffin
Attorney, Agent, or Firm—Jones, Day, Reavis & Pogue

[57] ABSTRACT

A device that determines liquid level or volume by means of charging a plurality of capacitors in sequence. Each capacitor is charged for a fixed time interval. The voltage level obtained is a function of the liquid level and is compared with a known voltage to obtain an output signal that can be used to represent liquid depth. The capacitors are formed by two concentric tubes, one inside the other in a spaced relationship. The tubes reduce the effect of sloshing in the tank, resulting in a more stable reading. To measure volume or level in an irregular shaped tank, the capacitors can be arranged in a non-linear manner. The device has no moving parts to wear out and thus results in higher reliability and longer life.

10 Claims, 5 Drawing Sheets

CAPACITIVE FLUID LEVEL SENSOR

FIELD OF THE INVENTION

The invention relates in general to fluid level sensors and in particular to a capacitive fluid level sensor that detects and measures the quantity of the fluid or a fluid level in a container.

BACKGROUND OF THE INVENTION

Fluid level sensors that use capacitors for the primary sensing elements are well known. However, prior devices have numerous drawbacks which result in either excessive cost, decreased accuracy or poor reliability and maintainability over extended periods of use. For example, ring plate capacitor devices are difficult, and hence costly, to manufacture. Detectors that use separate electronic circuits for each capacitor or group of capacitors require time-consuming and labor-intensive calibrations. RF circuits require extensive and precision components that introduce a much greater likelihood that one of those circuits will drift with age. Also, multi-circuit detectors must be reconfigured for each tank or container design.

The need, therefore, has long existed for an accurate yet inexpensive apparatus for detecting the level or quantity of fluid in a container.

SUMMARY OF THE INVENTION

The present invention overcomes the noted drawbacks of the prior art devices by providing a fluid level sensor that uses a capacitive probe that is economical to manufacture, yet accurate in its measurements. It has no moving parts; therefore, resulting in longer life and high reliability. The present invention also contemplates a new sensing technique and circuit for use with a capacitive probe that substantially improves the accuracy of the overall sensor apparatus while minimizing adverse effects due to time related measurements and ambient conditions and therefore provides a low-cost fluid level sensor apparatus that can be easily configured for any type of material container.

According to one embodiment of the invention, a fluid level sensor includes a capacitive probe that consists of two tubes or cylinders that are physically attached to each other, forming one long tube, but that are electrically isolated from each other. The elongated probe is adapted for vertical insertion into a fluid container such as an automobile or aircraft fuel tank. The capacitor formed by the two tubes or cylinders is also vertically oriented when the probe is placed in the tank. The vertical orientation of the capacitor allows the fluid to be the dielectric between the plates. As the fluid level falls, a greater area of the plates is exposed to air as the dielectric and changes the capacitance of the capacitor.

In the preferred embodiment of the invention, one of the tubes, for instance the outer tube, is a unitary tube that forms one capacitor plate and is electrically conductive throughout its entire inside surface area. The smaller tube is separated into a plurality of individual cylinder segments each forming a capacitor plate. The cylinder segments are physically attached to each other, forming one long tube, but they are electrically isolated from each other. The two tubes are fixed in a spaced relationship with respect to each other wherein the smaller tube is within and concentric with the larger tube. The capacitance of each individual segment of the smaller tube is dependent upon the separation distance between adjacent plates on the two tubes, the area of each conductive plate forming a cylinder segment on the inside tube, and the dielectric constant of the material between the plates. Each capacitor formed by a separate segment is accessed separately and charged for a fixed amount of time. The voltage level is then compared to a predetermined voltage level to see if that particular capacitor is submerged in liquid or is in open air. Such comparison for each of the capacitors is then used to drive a display to indicate either the fluid quantity or fluid level.

In another aspect of the invention, the capacitor, in the case of a single capacitor, or each individual capacitor in the case of the use of multiple capacitors, is charged to a fixed voltage level which is then decoded in a manner similar to pulse width modulation. Such pulses are coupled through a low-pass filter which will result in a voltage level proportional to the pulse width.

Because the tubes are inserted one within the other and separated by the dielectric, the possibility of false readings due to sloshing of the fluid caused by sudden movements is minimized.

Still another aspect of the invention contemplates a capacitor sensor probe having a plurality of separate conductive surfaces arranged on the outer surface of an inner tube of the probe in a non-linear relationship to linearize the measurement of a liquid in an irregular-shaped container.

Another aspect of the invention utilizes a novel sensing circuit which sequentially charges the capacitors to a fixed voltage level over a time interval to obtain pulses whose width varies with the depth of the liquid and includes means for decoding each pulse width to determine the liquid depth. The decoder comprises a low-pass filter and means for coupling the pulses to the low-pass filter to obtain a voltage level output proportional to the pulse width that represents liquid depth.

The invention also contemplates at least a third elongated tube concentric with and spaced from the first and second elongated tubes and having an electrically conductive surface on the third elongated tube and electrically parallel with a selected one of the conductor surfaces on the first and second elongated tubes to increase the capacitance and the sensitivity of the device.

The present invention also contemplates a low cost yet highly accurate circuit and sensing technique for detecting capacitance variations in the probe capacitors due to the presence or absence of fluid. The circuit and the sensing techniques may be used preferably with the capacitor probe of the present invention but may also be used with other capacitor probe designs.

BRIEF DESCRIPTION OF THE DRAWINGS

These and other aspects of the invention will be more fully explained and readily appreciated from reading the detailed description that follows, in view of the accompanying drawings in which like numbers represent like elements and in which.

DETAILED DESCRIPTION OF THE DRAWINGS

Figures 1, 3:
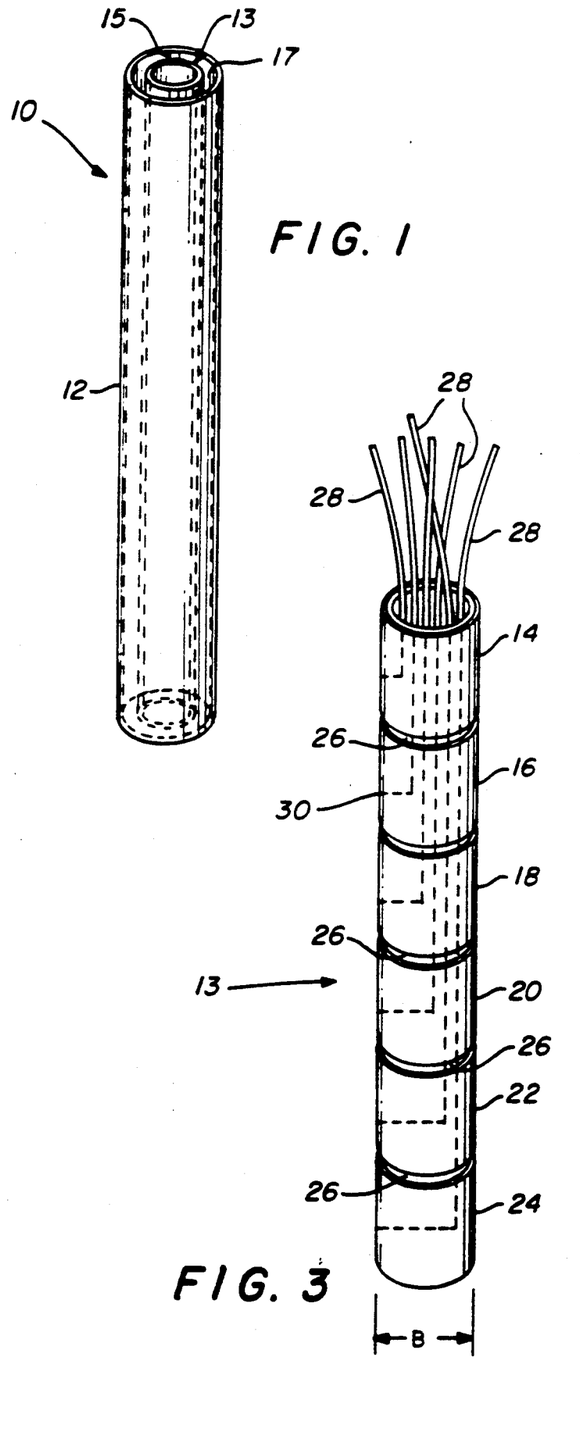
FIG. 1 is an isometric view of the capacitive probe of the present invention illustrating an open end thereof.
FIG. 3 is an isometric view of the inner tube of the preferred embodiment of the probe illustrated in FIG. 1, illustrating in particular the plurality of conductive segments that are insulated from each other and form the conductive surface on the outside thereof to form the other plate of a series of capacitors.

An isometric view of the preferred embodiment of the capacitive probe of the present invention is illustrated in FIG. 1 as indicated generally by the numeral 10. It includes an outer tube or cylindrical element 12, an inner tube or cylindrical element 13, and spacers 15 of any well-known type that are insulators for maintaining the cylinders 12 and 13 in a concentric spaced relationship having space 17 therebetween so as to form a capacitive element. The dielectric in the space 17 may be either air or a fluid in which the capacitive probe 10 is immersed. The bottom of the tube 10 is open and spaced above the bottom of the container so that fluid can enter the space 17. If desired, orifices may be strategically placed in the outer tube 12 to allow the fluid to enter the space 17.

Figure 2:
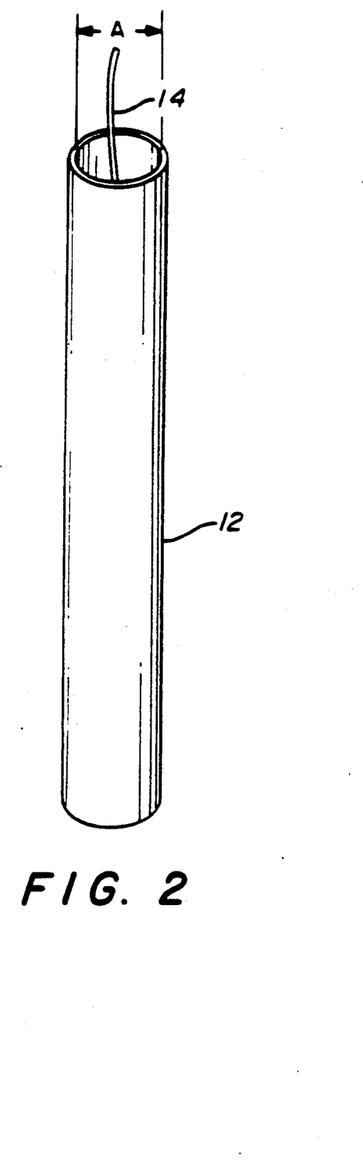
FIG. 2 is an isometric view of the outer tube of the probe shown in FIG. 1 wherein the inner surface of the outer tube is made a conductive and therefore is one plate of the capacitor.
Figure 5:
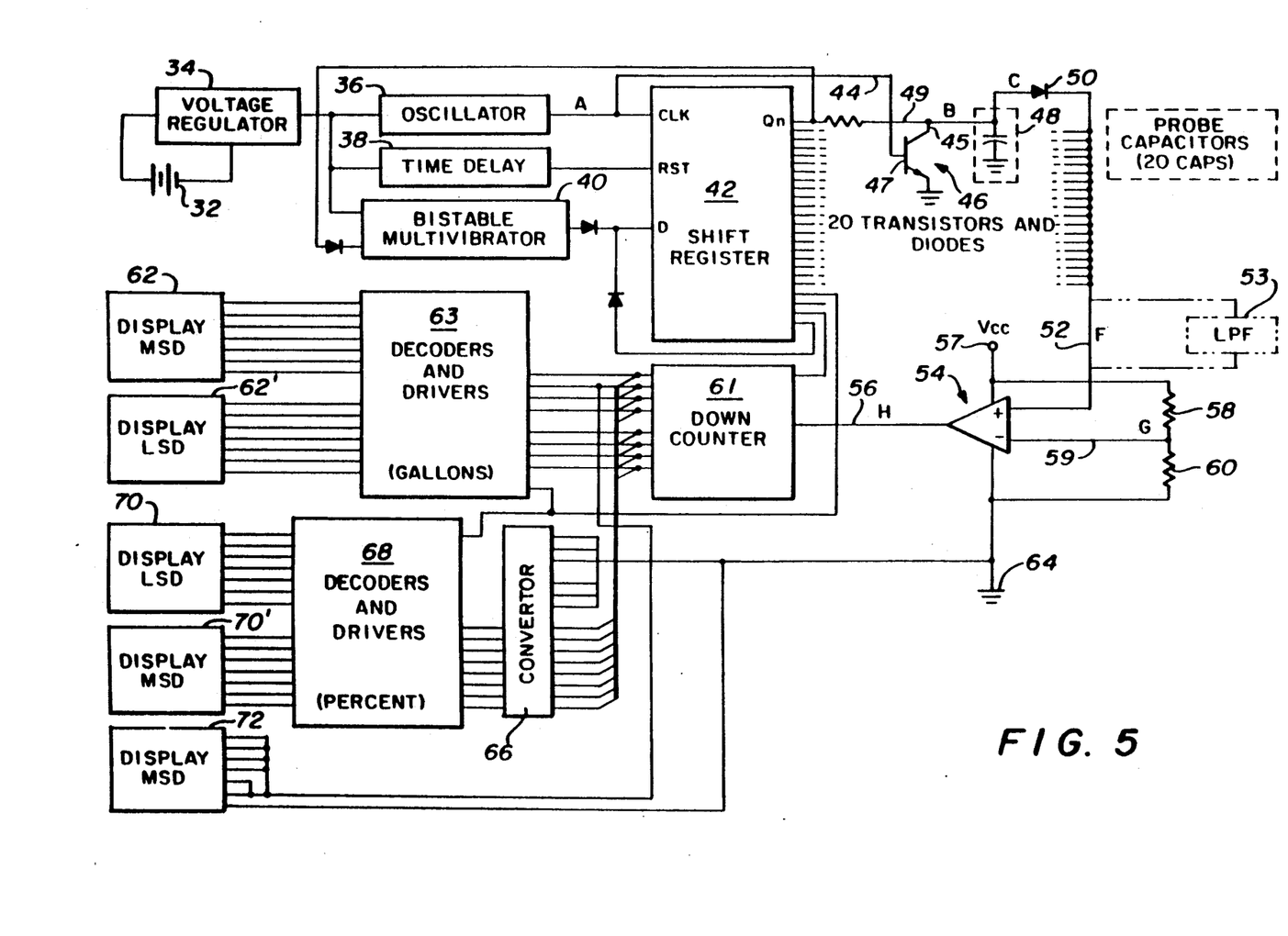
FIG. 5 is a circuit diagram of the sensing circuit that charges the capacitors, detects whether the capacitor is in or out of the liquid, and converts the detection signals into display signals for indicating either volume in gallons or percent.

FIG. 2 is an isometric view of the outer tube or cylinder 12 that has the inner surface thereof plated or otherwise metalized and that has a conductive strap or wire 14 attached to the inner conductive plate for connection to the circuitry shown in FIG. 5. The inside diameter of tube 12 is shown by the letter A in FIG. 2.

FIG. 3 is an isometric view of the inner tube or cylinder 13 that is the preferred embodiment of the present invention. As can be seen in FIG. 3, segments 14, 16, 18, 20, 22, and 24, are each formed of electrically conductive material plated on, or otherwise attached to, and separated from each other electrically, by an insulating material 26 that runs the full length of the probe and supplies the mechanical strength needed to hold it together. Electrical conductors 28 are equal in number to the number of segments 14-24 and each conductor 28 is electrically connected to a respective one of the conductive segments as by soldering at a point such as, for instance, point 30. Thus, each of the electrically conductive segments 14-24 is electrically connected to one of the conductors 28. The outside diameter of the tube or cylinder 13 shown in FIG. 3 is indicated to have a outer diameter B.

When the outer tube 12 illustrated in FIG. 2 is placed over the inner tube 13 shown in FIG. 3, the composite probe shown in FIG. 1 is obtained. Each of the conductive segments 14-24 forms a capacitor with the inside conductive surface of the outer tube 12. While six conductive segments are illustrated in FIG. 3, it should be noted that this number is for example only and may include more or less as needed. Further, the conductive elements 14-24 illustrated in FIG. 3 may be of different length or area in order to linearize the output signals in an irregular shaped tank. Thus, if the upper portion of the probe illustrated in FIG. 3 is in a portion of the tank that has a smaller volume and wherein the liquid level drops more rapidly than the lower portion, the upper portion may have a number of capacitive elements such as 14, 16, and 18, that are greater in length than the conductive elements 22 and 24 that are in the lower portion of the tank. In addition, the lengths of the segments may vary in a geometric progression in order to accommodate irregular sized tanks.

When a charge is placed on any one of the capacitors, it will charge in a well-known manner to a predetermined voltage. The capacitance of each separate conductive segment of the smaller tube illustrated in FIG. 3 is dependent upon (1) total distance between tubes 12 and 13, (2) the length of the conductive segment cylinders on the inside tube 13, and (3) the dielectric constant of the material between the tubes in the space 17. Capacitance can be calculated using the following formula if fringe effects are ignored.

$$C = \frac{2 l \pi e_o k}{\text{natural log of } (a/b)} \quad (1)$$

where
l = the length of the conductive cylinders in meters;
$e_o = 8.85 \times 10^{-12}$ coulombs/newton meter
k = the dielectric constant of liquid or air;
a = the inside radius of the largest tube in meters; and
b = the outside radius of the smaller tube in meters.

If all of the elements in Equation 1 are held constant except for the dielectric constant of the medium between the tubes, the capacitance change is directly proportional to the dielectric constant. Some of the dielectric constants that may be encountered by the probe are:
Air—1.0
Octane—1.8
SI Oil—2.7
Ethanol—24.6
Methanol—32.7
Water—80.0

The use of the term "liquid" herein is intended to encompass all liquid, including, water, fuel, oil, and the like.

Each capacitor formed by one of the segments 14-24 in FIG. 3 and the outer tube 12 in FIG. 2 is accessed separately and charged to a predetermined voltage. The predetermined charged voltage is compared to some predetermined voltage level to see if each capacitor is submerged in liquid or in open air. The formula used to calculate the voltage potential across a charging capacitor is set forth as follows:

$$V_c = (1 - e^{-t/Tau}) \quad (2)$$

wherein
$V_c$ is the voltage across the capacitor;
t is the time that the capacitor is allowed to charge; and
Tau is the time constant (capacitance C × resistance R).

Figure 4:
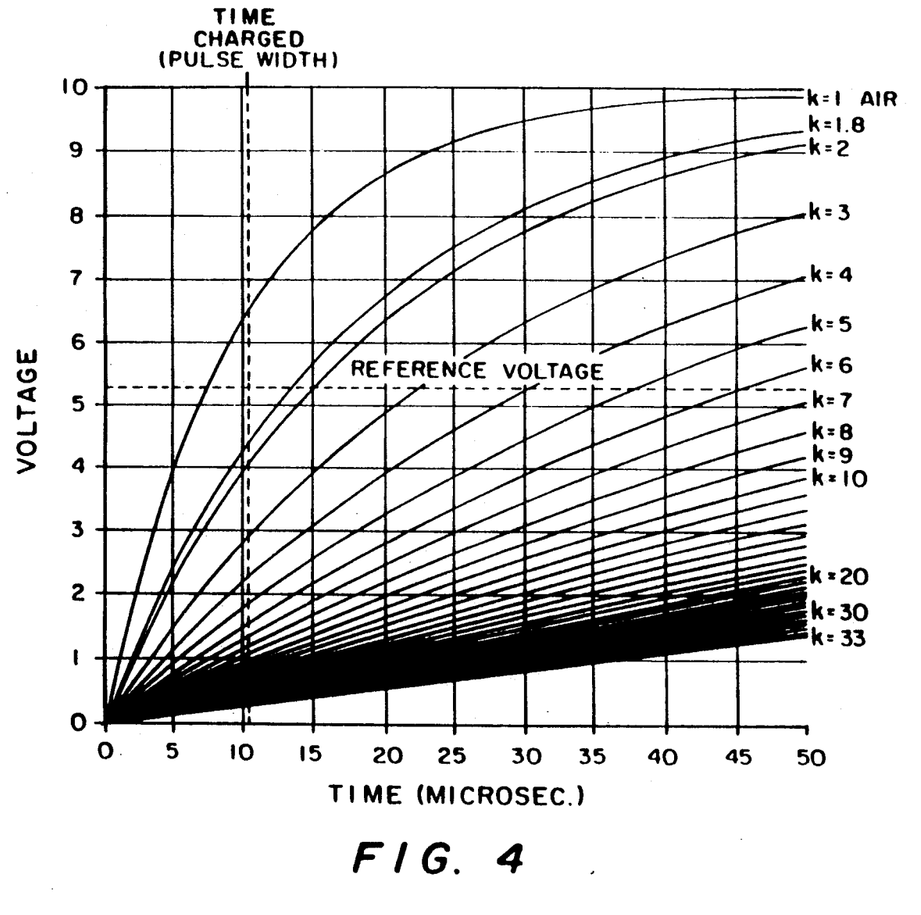
FIG. 4 is a graph illustrating the relationship between charging time of the capacitor and the voltage obtained with various dielectrics.

As can be seen from the equation (2), if all elements are held constant except the capacitance, $V_c$ decreases as capacitance increases. Thus, a voltage level in the sensing circuit is selected that is slightly less than that amount to which the capacitor will charge when air is the dielectric. As can be seen in FIG. 4, a chart of curves represents the charge on a capacitor versus time with respect to dielectrics having different constants. It will be noted in FIG. 4 that the capacitors do not charge in a linear path, but charge exponentially due to the decreasing current during the charge-up of the capacitor. To counteract this effect, only the first part of the charge-up curve is used in the area that is most linear. FIG. 4 illustrates the reference voltage with respect to the charge-up of the capacitor with dielectric constants ranging from 1 to 33. As can be seen, the reference voltage is the point at which the difference in voltage between curve K=1 and the curve K=1.8 is the greatest. Maximizing this difference in voltage amplitude will basically increase the circuit's tolerance to error. With the reference voltage shown at 5.3 volts in FIG. 4, if the capacitor is out of the liquid, in approximately 10 microseconds the capacitor will charge to approximately 6.3 volts. When the charge voltage is compared to the reference voltage, the circuit will determine that the charge voltage is higher than the reference voltage, thus indicating that the capacitor is out of the liquid. If, however, the dielectric had a constant of 1.8, the voltage in the capacitor is approximately 4.3 volts in 10 milliseconds and a comparison of the charge voltage with the reference voltage would indicate that the charge voltage is less than the reference voltage and thus the capacitor is in the liquid. This two volt difference in voltage levels, 6.3 and 4.3 volts, enables the reference voltage to be set at 5.3 volts. This leaves room for error which could occur from a change in temperature or a small change that may occur at the output of the voltage regulator 34.

FIG. 5 is a schematic representation of the novel circuit for sampling the capacitors and indicating on a display the quantity or level of fuel or liquid in a container.

Figure 6:
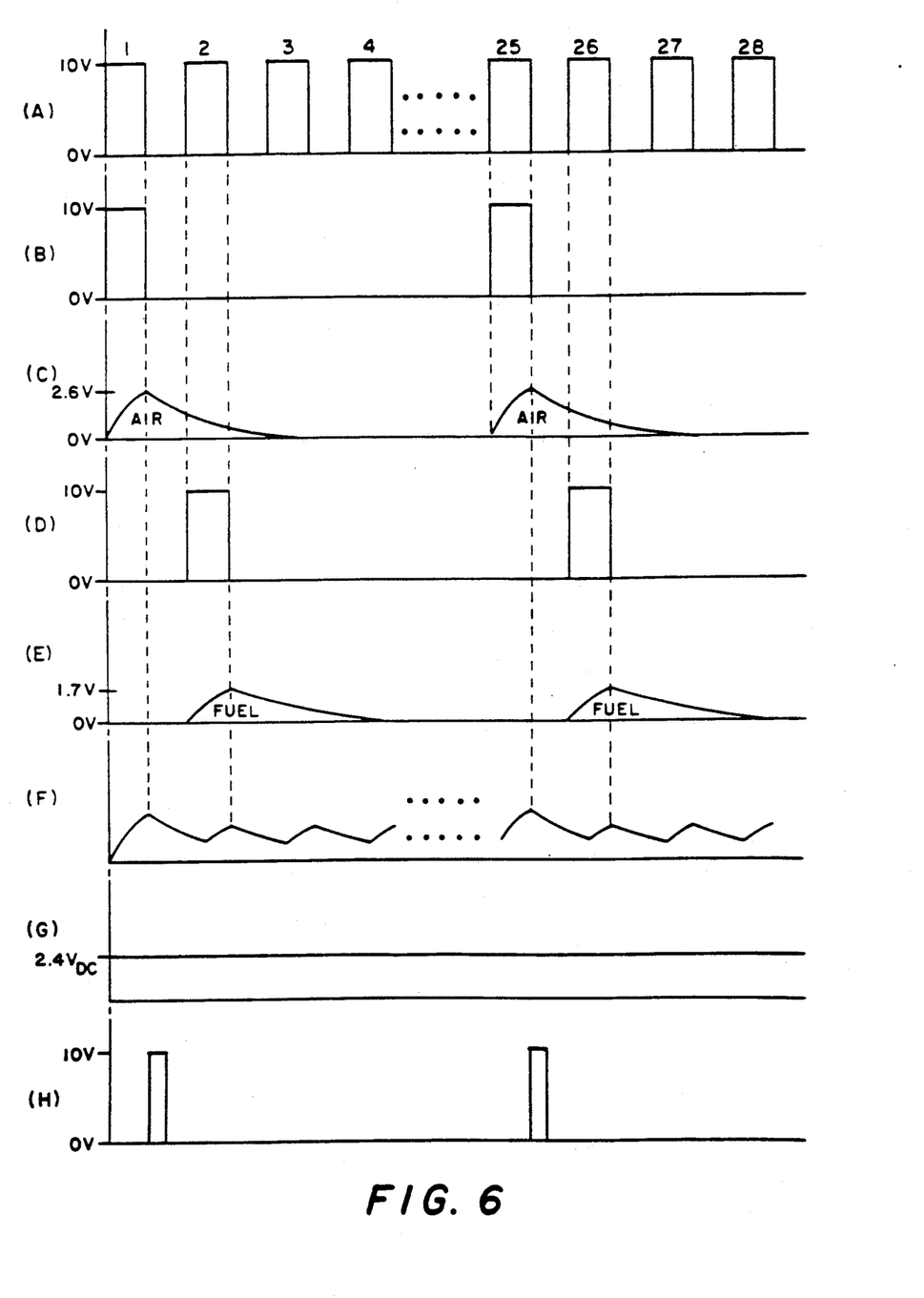
FIG. 6 is a series of waveforms A-H representing the waveforms at various points in the circuit illustrated in FIG. 5.

A power supply 32 is coupled to a voltage regulator 34 which keeps the voltage amplitude constant. The voltage is supplied to an oscillator 36, time delay circuit 38 and bistable multi-vibrator 40, as well as the other circuit elements. The oscillator 36 clocks a shift register 42 to produce a pulse on the first output, then the second, the third, and so on, in sequence, thereby multiplexing the outputs. The outputs on those lines are coupled to the collectors 45 of individual NPN transistors 46. Each of those transistors is associated with a corresponding capacitor in the probe. In the present example, and in the preferred embodiment, 20 capacitors are utilized. However, this representation is for explanation only and there could be more or less capacitors as desired. The base 47 of each of the transistors 46 is biased on and off by the oscillator 36 that simultaneously clocks the shift register 42. This is required to reduce the pulse width of the outputs of the shift register 42. The shift register 42 holds each output high for one cycle of the clock or oscillator 36, which results in one of the shift register 42 outputs being high at all times. This circuit requires that, between each two successive charging pulses there is some amount of time with no capacitors being charged. This gives the capacitor that wa last charged time to discharge. Thus, between the time that oscillator 36 clocks the shift register 42 to initiate a pulse and the time that time delay circuit 38 resets the shift register, the pulse generated by shift register 42 is reduced in width by the oscillator control on line 44 to the base 47 of transistor 46. As stated, the reduction in the pulse width allows time for the capacitor last charged to be discharged. Such pulses are illustrated in FIG. 6, waveform A.

At point B on line 49, the first pulse appears as a shortened pulse as illustrated by waveform B. If it is assumed that capacitor 48 in FIG. 5 is out of the liquid and has an air dielectric, it begins to charge for the predetermined width of the pulse as illustrated in waveform C in FIG. 6. When the pulse terminates, the capacitor 48 begins to discharge as illustrated. If it is assumed that the second capacitor is in a liquid such as fuel, for example, when the second pulse is generated as illustrated in waveform D, it is applied to the next capacitor and because it is in a liquid such as fuel which has a different dielectric constant, it charges to a lesser degree as illustrated in waveform E at FIG. 6. When the charging pulse terminates the capacitor begins to discharge as indicated. The subsequent capacitors, all being in liquid, would have a charged waveform as illustrated by waveform E in FIG. 6. The resultant waveform at point F in FIG. 5 and as shown by waveform F in FIG. 6 is a summation of all of the charging and discharging times of each of the capacitors. Waveform G in FIG. 6 represents the reference voltage developed at Point 6 in FIG. 5 by resistors 58 and 60. These two resistors are coupled between the power source 57 and ground 64, thereby developing a fixed voltage chosen in this instant, as illustrated by waveform G, to be 2.4 volts DC. This voltage is coupled to one input of comparator 54. The other input is the voltage represented by waveform F illustrated in FIG. 6 and the two voltages are compared. As indicated by waveform H in FIG. 6, only the 2.6 volts developed by the first capacitor that has the air dielectric exceeds the reference voltage, thus causing the comparator 54 to produce an output pulse on line 56. Thus, as the effect of each charging voltage goes into the non-inverting input of comparator 54 and the reference voltage is applied to the inverting input of the same comparator, when the reference voltage is greater, the output remains at a low state and when the charging voltage is greater, the output goes to a high state. This results in the output creating a high pulse with each capacitor when the medium is air.

This train of pulses then goes through a down counter 61. This counter is synchronized with the pulse train to go to its maximum count, 20 in this particular case to equal the number of capacitors, just prior to receiving the pulse train. It then counts down one unit for each pulse which was generated by a capacitor in air. This results in the final count being the number of capacitors in liquid. For example, if six of the 20 capacitors are in liquid and the remainder are in air, the displays 62 and 62' may show six. This number is fed to the decoders and drivers 63 which cause the information to be displayed on display element 62 and 62' as both most significant and least significant digits. The counter 61 then awaits the next count to be completed. This circuitry operates at a high frequency to avoid displays that appear to be flashing.

As can be seen in FIG. 5, the display may be in percentage instead of gallons by using convertor circuit 66, decoders and drivers 68 and displays 70 and 70'. An additional display 72 may be utilized if desired to show only the most significant bit or digit.

As indicated previously, the liquid level in a container may be determined by sequentially charging the capacitors to a fixed voltage level. Since the time for charging the capacitors will vary depending upon the dielectric, it will be understood that a pulse will be generated for each capacitor and the pulse width will vary with the dielectric when transistor 46 is removed from the circuit. By coupling the pulse widths to a low-pass filter as a decoder a voltage level output will be obtained that is proportionate to pulse width. By establishing predetermined voltage levels on line 59 representing predetermined liquid levels for comparison with the decoded voltage level, it can be determined which capacitors are in or out of the fluid and then the level of the liquid can be determined. In such case, in FIG. 5, the low-pass filter 53 will be located in place of line 52 at point F with its output being coupled to the positive input of comparator 54 as indicated by the dashed lines. As can be seen in FIG. 4, if the dielectric is air and the predetermined voltage level is 6 volts, it will require approximately 9 microseconds for the capacitor to charge the 6 volts. If the dielectric is octane (k=1.8), it will require approximately 17 microseconds to charge to the 6 volts.

As stated earlier, the capacitance of the probe may be increased by adding a third elongated tube concentric with, and spaced apart from, the first and second elongated tubes 12 and 13. This can be accomplished by having the inside of tube 13 plated with a conductive material that is coupled in parallel with the plate of outer tube 12. Again, the outer surface of outer tube 12 could be plated and the plate coupled in parallel with inner plate of outer tube 12. If desired, the third elongated tube may be separate from tubes 12 and 13 and located concentrically within and spaced from the inner tube 13. Again, the plate of the third tube may be connected in parallel with the plate of the outer tube 12.

Figure 7:
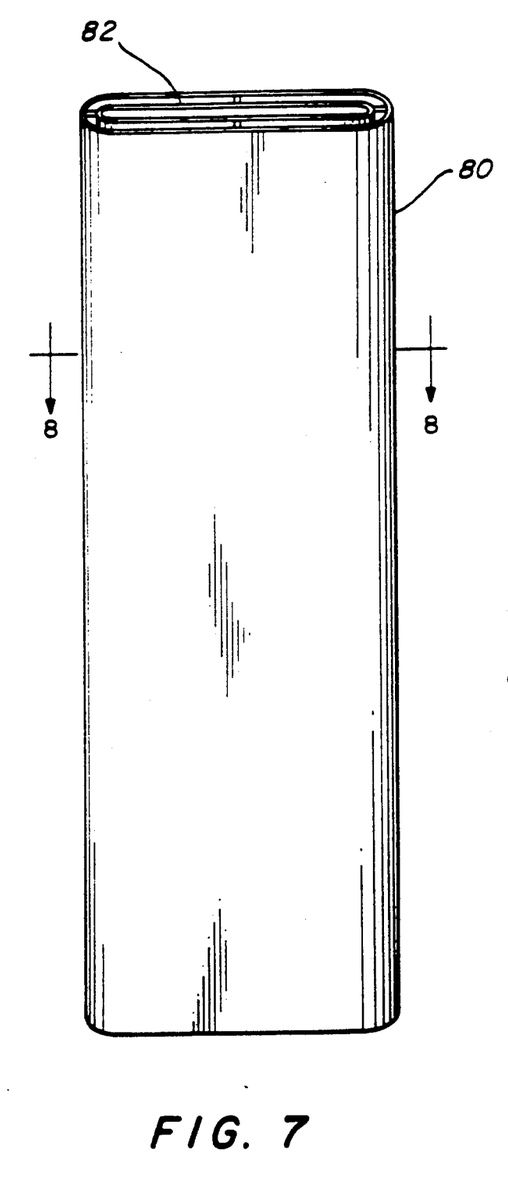
FIG. 7 is a side view of alternate embodiment of the capacitive fuel level sensor.
Figure 8:
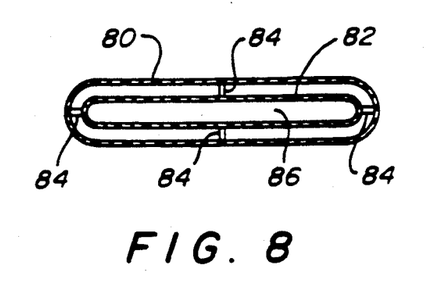
FIG. 8 is a cross sectional view of the alternate version of the sensor taken along lines 8—8 of FIG. 7.

FIG. 7 is a side view of an alternate embodiment of the probe that is oval in shape as can be seen in the cross section shown in FIG. 8 and taken along lines 8—8 of FIG. 7. The outer tube 80 is plated on the inside as previously described while the inner oval tube 82 is plated on the outside thereof with a plurality of separated conductive elements to form the plurality of capactor plates as previously described. The connections to each of the plates extend through space 86 for external coupling. The inner oval tube is held in spaced relationship with the outer oval shaped tube 80 by nonconductive spacers 84. The outer oval shape tube 80 may have a length of approximately 7 inches, a width on its long axis of approximately 2.44 inches and a width across the short axis of approximately ½ inch. This type of probe is valuable in that it can be installed in small areas in tanks of varying shapes.

Thus, the apparatus as described and shown herein provides a low cost yet highly accurate device for determining the fluid level or volume in a container. The apparatus can be easily adapted to any number of different container configurations by arranging the capacitors in a non-linear fashion or in some other manner such as a geometric progression to linearize the output in an irregular shaped tank. This could be done by varying the length of the various capacitor elements in a particular area on the probe to compensate for irregular variations in a container configuration. Further, it has no moving parts, thereby resulting in longer life and high reliability. It has a built-in anti-sloshing tube by the construction of the capacitor probe with an inner tube and an outer tube concentric with each other and forming the capacitor elements.

While the invention has been shown and described with respect to a particular embodiment thereof, this is for the purpose of illustration rather than limitation; and other variations and modifications of the specific embodiment herein shown and described will be apparent to those skilled in the art all within the intended spirit and scope of the invention. Accordingly, the patent is not to be limited in scope and effect to the specific embodiment shown and described nor in any other way that is inconsistent with the extent to which the progress in the art has been advanced by the invention.

What is claimed is:

1. A device for sensing the liquid level in the container comprising:
   first and second elongated tubes in said container arranged one inside the other in a concentric, spaced relationship to reduce the effect of liquid sloshing in the container;
   a continuous conductive surface on one of the elongated tubes to form one plate of a capacitor;
   a plurality of separate, electrically-conductive surfaces arranged in a longitudinally-spaced relationship along the surface of the other of the elongated tubes in cooperative spaced relationship to said continuous conductive surface to form a plurality of individual capacitors that progressively increase in number from one end to the other of the tubes;
   said separate electrically-conductive surfaces being physically and electrically isolated from one another;
   each said separate electrically-conductive surface occupying a discrete longitudinal length of said other tube and with no part of one separate electrically-conductive surface extending beyond its discrete longitudinal length of said other tube into a discrete longitudinal length of said other tube occupied by an adjacent separate electrically-conductive surface;
   means for utilizing the plurality of capacitors to determine the liquid level in the container; and means for individually electrically connecting said continuous conductive surface and each of said separate electrically-conductive surfaces with said means for utilizing.

2. A device as in claim 1 wherein the means for utilizing the capacitors to determine liquid level comprises:
   means for individually charging each capacitor for a fixed amount of time to achieve a charged voltage level that varies with the dielectric constant and depth of the liquid;
   means for comparing said charged voltage level for each capacitor with a predetermined reference voltage level for each capacitor;
   means for determining the voltage difference between said charged voltage level and said predetermined reference voltage for each capacitor to establish whether each capacitor is completely in liquid, partly in liquid and partly in air, or completely in air; and·
   means for using said voltage difference for each capacitor to determine the liquid depth.

3. A device as in claim 2 further comprising:
   an oscillator coupled to the charging means for causing individual outputs to be coupled to the capacitors in sequence;
   a gating device coupled between each output and ground potential; and means coupling the oscillator to each gating device to determine the fixed time each capacitor is charged.

4. A device as in claim 1 wherein the means for utilizing the plurality of capacitors to determine liquid level comprises:
   means for sequentially charging each capacitor for a fixed amount of time to achieve a voltage level that varies with the capacitor's location with respect to the liquid; and
   means for measuring the voltage level achieved by each capacitor to determine if the capacitor is in the liquid, out of the liquid, or partially immersed in the liquid so as to determine the liquid level.

5. A device as in claim 4 further comprising:
   a reference voltage representing a capacitor immersed in liquid in the container;
   means for comparing each capacitor voltage level with the reference voltage to generate an output signal representing a change in the liquid level in the container;
   display means for presenting a visual indication of the liquid level in the container; and
   means coupling the comparator output signal to the display means to cause a visual representation of the liquid level in the container.

6. A device as in claim 1 wherein the means for utilizing the plurality of capacitors to determine liquid level comprises:
   means for sequentially charging each capacitor to a fixed voltage level over a time interval to obtain pulses whose width varies with the capacitor location with respect to the liquid; and
   means for decoding the pulse width for each capacitor to determine if the capacitor is in the liquid, out of the liquid or partially immersed in the liquid so as to determine liquid level in the container.

7. A device as in claim 6 wherein the means for decoding the pulse widths comprises:
   a low-pass filter; and
   means for coupling the pulses from each capacitor to the low-pass filter to obtain a voltage level output proportional to the pulse width that represents the location of each capacitor in the liquid, out of the liquid, or partially immersed in the liquid, so as to determine the liquid level in the container.

8. A fluid level sensor for a container comprising:
   first and second elongated tubes in said container arranged one inside the other in a concentric, spaced relationship to reduce the effects of fluid sloshing in the container;
   a continuous conductive surface formed in the inside of the outer tube and the outside of the inner tube to form an elongated capacitor;
   means for charging the elongated capacitor at consecutive intervals for a fixed amount of time to achieve a voltage level that varies with the dielectric constant and the depth of the liquid in which the elongated capacitor is immersed;
   a plurality of reference voltage levels each of which represents a predetermined liquid level in the container;
   means for sequentially comparing each reference voltage level with the capacitor voltage level obtained at each consecutive interval to generate an output signal representing a change in the liquid level in the containers;
   a counter coupled to the output of the comparing means for counting each output signal representing a change in liquid levels; and
   decoding means coupled to the counter for converting the count to signals for driving the visual display.

9. A device for sensing the liquid level in the container comprising:
   first and second elongated tubes in said container arranged one inside the other in a concentric, spaced relationship to reduce the effect of liquid sloshing in the container;
   a continuous conductive surface on one of the elongated tubes to form one plate of a capacitor;
   a plurality of separate, electrically-conductive surfaces arranged in a spaced relationship on the surface of the other of the elongated tubes to form a plurality of individual capacitors;
   at least a third elongated insulated surface concentric with and spaced from the first and second elongated tubes;
   an electrically conductive surface on the third elongated insulated surface connected in electrical parallel with a selected one of the conductor surfaces on the first and second elongated tubes to increase the capacitance and the sensitivity of the device; and
   means for utilizing the plurality of capacitors to determine the liquid level in the container.

10. A device as in claim 9 wherein the parallel connected conductive surfaces are ground planes.

* * * * *